July 15, 1941.      R. KRUG      2,249,146

LATHE

Filed April 8, 1940

INVENTOR
RUDOLF KRUG
BY
ATTORNEYS

Patented July 15, 1941

2,249,146

UNITED STATES PATENT OFFICE 2,249,146

LATHE

Rudolf Krug, Forbach, Murgtal, Germany

Application April 8, 1940, Serial No. 328,459
In Germany April 29, 1939

5 Claims. (Cl. 29—27)

This invention relates to a watchmaker's lathe provided with electric drive and capable of satisfying all requirements which a lathe has to meet in this particular trade.

In some of the known hand-driven lathes of this class clamping means are provided to secure them to a flywheel frame fixable in a vise and serving as drive. Although they are universally movable and can be turned into any desired position, such lathes nevertheless fail to give perfect satisfaction on account of the inconvenient manual drive.

Other types of known lathes, also fixable in a vise, are driven by an electromotor screwed to the bench. A structure of this kind is, however, disadvantageous, since the lathe can be used only in a position determined by the arrangement of the motor.

It is further known to mount a lathe with its driving motor on a common base plate placed on the bench, but in this case the base plate can be turned only with difficulty to bring the lathe into the most convenient working position. As the lathe is, moreover, firmly mounted on the base plate, the bore of the spindle is always either on the right or left, though it is possible of course to operate with the lathe when the shaft is in the direction of view. Furthermore, a construction of this type forms a unit and does not permit the attachment of an existing lathe.

It is one of the objects of the invention to overcome all the difficulties mentioned by providing a precision lathe with electric drive for use by watchmakers, which with its drive is mounted on a common base plate fitted with a clamping means for detachably securing the lathe thereto and rotatably disposed on a supporting plate or stand. In this way it becomes possible not only to conveniently adjust the lathe to the most favorable working position but to use also any existing lathe in the structure.

In a known construction, a stepped pulley constituting a countershaft gearing is firmly united with a motor, and both the motor and the stepped pulley move as a unit. However, this arrangement is suited for light motors only and does not meet all requirements.

According to the invention, a stepped pulley is, therefore, mounted on a countershaft which is disposed so that it may be swung about the motor shaft which is adjustably secured to the cylindrical motor casing, whereby the distance between the countershaft and the driving pulley on the lathe may be adjusted without moving the motor.

In addition to performing turning operations, a watchmaker has often to perform sawing operations, which hitherto were exclusively carried out by means of manually driven circular saws.

Accordingly, it is another object of the invention to utilize the motor driving the lathe also for driving the saw. This problem has been solved according to the present invention by arranging the saw on the countershaft and having it work through a table secured to a support for said countershaft so that the lathe and saw form a handy combination.

These and other objects and advantages of the invention will appear more clearly from the following specification in connection with the accompanying drawing, in which.

Figure 1:
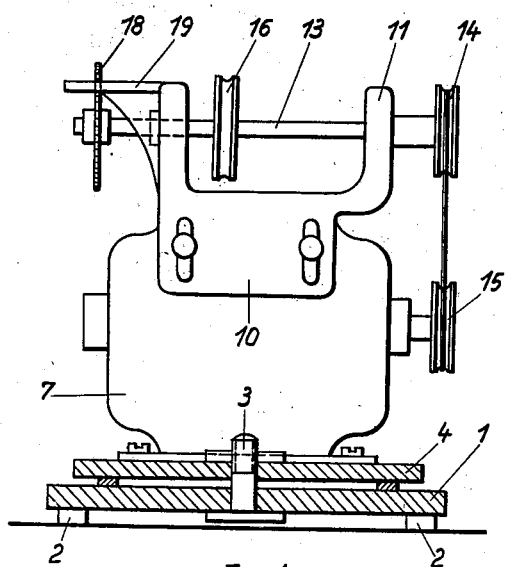
Figure 1 is a section along the line I—I of Figure 2.
Figure 2:
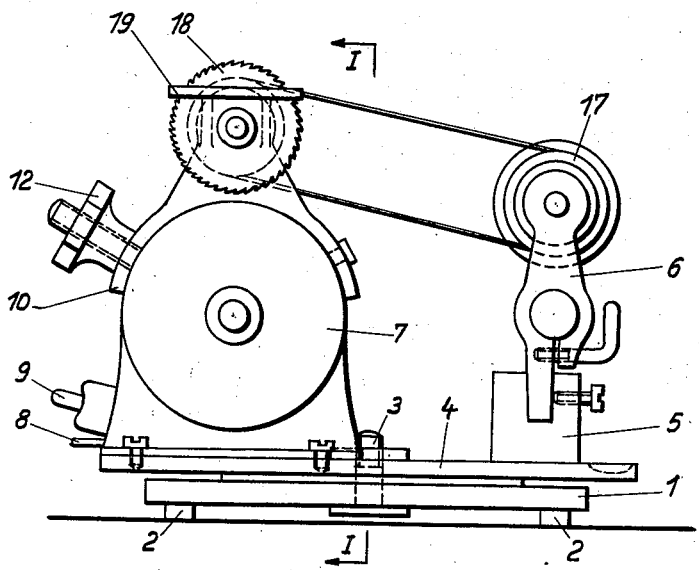
Figure 2 is a side view of a lathe according to the invention equipped with a driving motor and a circular saw.

Referring now to the drawing, I designates a supporting plate or stand provided with feet 2 to insure stability and to allow a convenient placement of the entire assembly.

Rotatably secured to said stand, for instance by means of a screw 3, is a base plate 4 provided with a clamping appliance 5 for securing a lathe 6 to said base plate. Also secured to the base plate 4, for instance by screws, is an electric motor 7 for driving the lathe. The numeral 8 designates the connection for the current supplied to the motor 7, which latter is provided with a changeover switch 9.

Adjustably mounted on the cylindrical casing of the motor 7 is a correspondingly shaped base member 10 held in its desired position by clamping nuts 12 cooperating with screws passing through slots in the base member 10. The base member 10 comprises a support 11 carrying a countershaft 13. When loosening the clamping nuts 12, the countershaft 13 may be swung on the cylindrical casing of the motor 7 about the motor shaft and, thereby, adjusted as to its distance from the lathe 6.

The countershaft 13 carries a pulley 14 adapted to be drivingly connected by a belt or cord with a pulley 15 disposed on the shaft of the motor 7. Also mounted on the countershaft 13 is a pulley 16 for driving connection with a stepped pulley 17 on the lathe 6. The countershaft 13 furthermore carries a circular saw 18 which passes through a table 19 secured to the countershaft support 11.

As will be clear from the above, the entire assembly, due to the support plate I being mounted on feet 2, may be easily moved to any desired place where, by rotation of the the base plate 4, the lathe 6 together with the motor 7 and the countershaft 13 supported thereby may, as a unit, be moved into any convenient position.

By tightening of the corresponding clamping means the assembly is thus held in its required position; the base member 10 may, in the manner described above, be shifted about the motor axis, thereby adjusting the distance between the countershaft 13 and the stepped pulley 17 of the lathe without affecting the driving connection between the motor 7 and the pulley 14 on the countershaft 13.

If it is desired to exchange the lathe 6, all that is required merely consists in loosening the clamping screws which connect the lathe to the clamping appliance 5, withdrawing the lathe 6 and substituting therefor another lathe. Due to the adjustability of the base member 10 and thereby of the countershaft, lathes with different stepped pulleys may be used in connection with the present invention without having to change the driving belt or cord.

The connection of the base member 10 with the motor 7 furthermore enables an easy and simple exchange of the supporting member and of the countershaft and the pulleys, as well as the saw carried thereby. To this end, it is merely necessary to unscrew the clamping nuts 12. In this way, also saws and pulleys of different diameters on the countershaft may be used in the arrangement of the present invention.

The device according to the invention, therefore, constitutes, due to its universal possible use, an ideal lathe for watchmakers, which universal use is furthermore broadened by the arrangement of the saw 18 on the countershaft.

It will be understood that I desire to comprehend within my invention such modifications as come within the scope of the claims and the invention.

I claim:

1. In a watchmaker's lathe the combination of a stationary electric driving motor having a casing with a common rotatable base plate for the lathe and said driving motor, clamping means on said rotatable base plate for detachably securing the lathe thereto, said clamping means and said motor casing being rigidly connected to said rotatable plate for rotation as a unit, and a supporting plate for said rotatable base plate, said supporting plate having feet thereon for universal placement of the entire assembly.

2. In a watchmaker's lathe the combination of a stationary electric driving motor having a casing with a common rotatable base plate for the lathe and driving motor, clamping means on said rotatable base plate for detachably securing the lathe thereto, a supporting plate for said rotatable base plate, a countershaft spaced from the motor shaft of said electric motor and comprising means to effect driving connection between said motor and said lathe, said countershaft being detachably secured to the casing of the motor and movable about the axis thereof.

3. In a watchmaker's lathe the combination of a stationary electric driving motor having a casing with a common rotatable base plate for the lathe and drive, clamping means on said rotatable base plate for detachably securing the lathe thereto, a supporting plate for said rotatable base plate, a countershaft comprising means for effecting driving connection between said motor and said lathe, and supporting means supporting said countershaft and being adjustably secured to said motor casing to permit adjustment of the relative spacing of said countershaft and said lathe.

4. In a watchmaker's lathe the combination of a stationary electric driving motor having a casing with a common rotatable base plate for the lathe and drive, clamping means on said rotatable base plate for detachably securing the lathe thereto, a supporting plate for said rotatable base plate, a countershaft carrying means for transmitting the drive from said motor to said countershaft and said lathe, supporting means supporting said countershaft and detachably and displaceably securing said countershaft to said motor casing, and a circular saw arranged on the countershaft and working through a table attached to said supporting means.

5. In combination, a rotatable base, a stationary electric driving motor having a casing, a lathe spaced from said motor, supporting means detachably supporting said lathe, said motor casing and said supporting means being directly mounted on said rotatable base on opposite sides of the axis of rotation of said base, a countershaft comprising means for effecting a driving connection between said motor and said lathe, and means for varying the angular position of said countershaft relative to said motor and said lathe.

RUDOLF KRUG.